US010105847B1

(12) United States Patent
Latimer et al.

(10) Patent No.: US 10,105,847 B1
(45) Date of Patent: Oct. 23, 2018

(54) DETECTING AND RESPONDING TO GEOMETRIC CHANGES TO ROBOTS

(71) Applicant: X DEVELOPMENT LLC, Mountain View, CA (US)

(72) Inventors: Craig Latimer, Mountain View, CA (US); Umashankar Nagarajan, Santa Clara, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 198 days.

(21) Appl. No.: 15/177,323

(22) Filed: Jun. 8, 2016

(51) Int. Cl.
*B25J 9/16* (2006.01)

(52) U.S. Cl.
CPC ........... *B25J 9/1674* (2013.01); *B25J 9/1697* (2013.01); *G05B 2219/39412* (2013.01); *Y10S 901/09* (2013.01); *Y10S 901/47* (2013.01)

(58) Field of Classification Search
CPC ........ B25J 9/163; B25J 9/1638; B25J 9/1664; B25J 9/1666; B25J 9/1671; B25J 9/1674; B25J 9/1676; B25J 9/1692; B25J 9/1697
See application file for complete search history.

(56) References Cited

U.S. PATENT DOCUMENTS

2005/0273202 A1* 12/2005 Bischoff ................ B25J 9/1692
    700/263
2012/0250981 A1* 10/2012 Noda ..................... G06N 99/005
    382/155
2013/0331644 A1    12/2013 Pandya et al.
2014/0018957 A1*  1/2014 Matsumoto ............ B25J 9/1697
    700/251

OTHER PUBLICATIONS

Wolf, Jürgen, Wolfram Burgard, and Hans Burkhardt. "Using an image retrieval system for vision-based mobile robot localization." In Image and Video Retrieval, pp. 108-119. Springer Berlin Heidelberg, 2002.
Versino, Cristina, and Luca Maria Gambardella. "Learning the visuomotor coordination of a mobile robot by using the invertible Kohonen map." In From Natural to Artificial Neural Computation, pp. 1084-1091. Springer Berlin Heidelberg, 1995.
Broun, Alan, Chris Beck, Tony Pipe, Majid Mirmehdi, and Chris Melhuish. "Building a kinematic model of a robot's arm with a depth camera." In Advances in Autonomous Robotics, pp. 105-116. Springer Berlin Heidelberg, 2012.

* cited by examiner

*Primary Examiner* — Adam R Mott
(74) *Attorney, Agent, or Firm* — Middleton Reutlinger

(57) ABSTRACT

Methods, apparatus, systems, and computer-readable media are provided for detecting a geometric change in a robot's configuration and taking responsive action in instances where the geometric change is likely to impact operation of the robot. In various implementations, a geometric model of a robot in a selected pose may be obtained. Image data of the actual robot in the selected pose may also be obtained. The image data may be compared to the geometric model to detect a geometric difference between the geometric model and the actual robot. Output may be provided that is indicative of the geometric difference between the geometric model and the actual robot.

16 Claims, 5 Drawing Sheets

DETECTING AND RESPONDING TO GEOMETRIC CHANGES TO ROBOTS

BACKGROUND

Changing the configuration of a robot, whether by adding components such as end effectors or by having the robot pick up some object, may impact the robot's kinematic model. For example, suppose a small end effector of a robot is replaced with a much larger end effector, or vice versa. This will likely cause a change to the robot's kinematic model because, for instance, a change in mass between the end effectors will likely impact operation of one or more operational components of the robot. An operator of the robot may need to be made aware of such a change, e.g., so that he or she can account for the kinematic difference. Additionally or alternatively, the kinematic model may need to be updated so that the robot will continue to operate in a predictable manner. However, suppose a first end effector is replaced with a second end effector that is only slightly larger or smaller (or has only slightly different dimensions). The impact on the robot's kinematic model for such a substitution may be limited, and therefore may not affect how the robot is operated. Calculating a precise change to a robot's kinematic model every time a configuration of the robot is altered, no matter how significant the alteration, may be impractical and/or computationally expensive, especially where the configuration change is not likely to impact operation of the robot in any meaningful way.

SUMMARY

The present disclosure is generally directed to methods, apparatus, and computer-readable media (transitory and non-transitory) for detecting a geometric change in a robot's configuration and taking responsive action in instances where the geometric change is likely to impact operation of the robot. More particularly, in various implementations, image data may be captured of an actual robot in a selected pose. This image data may be compared to a geometric model (e.g., a CAD model) of the robot in the same or similar pose to detect a geometric difference between the model and the actual robot. In various implementations, output indicative of the detected geometric difference may be provided. In some implementations, the output may trigger a warning to a user that the robot may behave unpredictably as a result of the geometric difference. In some implementations, the output may be provided to a downstream routine that determines whether the detected geometric difference warrants an update to a kinematic model of the robot, or whether to halt operation of the robot, e.g., to avoid damaging the robot or its surroundings.

In various implementations, one or more bounded volumes containing to one or more operational components of the robot may be identified. For example, in three-dimensional geometric models, the one or more bounded volumes may include spheres, cubes, cuboids, cylinders, cones, and so forth. In two-dimensional geometric models, the one or more bounded volumes may include circles, squares, rectangles, various trapezoids or other polygons, and so forth. In various implementations, it may be determined whether a detected geometric difference between a geometric model and an actual robot (detected by comparing the image data to the geometric model) violates one or more bounded volumes. If so, then the output may trigger a warning to the user, trigger an update to the robot's geographic and/or kinematic model, or even cause operation of the robot to cease. In other implementations, a determination may be made that the geometric difference between the actual robot and the geometric model satisfies one or more thresholds.

In some implementations, a computer implemented method may be provided that includes the steps of: obtaining a geometric model of a robot in a selected pose; obtaining image data of the actual robot in the selected pose; comparing the image data to the geometric model to detect a geometric difference between the geometric model and the actual robot; and providing output indicative of the geometric difference between the geometric model and the actual robot.

This method and other implementations of technology disclosed herein may each optionally include one or more of the following features.

In various implementations, the method may further include updating the geometric model in response to the detected geometric difference. In some implementations, the output may include a warning that the robot will potentially behave unpredictably due to the geometric difference. In some implementations, the geometric model of the robot may be based on a computer-aided design of the actual robot.

In various implementations, obtaining the geometric model may include determining one or more bounded volumes containing one or more operational components of the robot. In various implementations, at least one of the one or more bounded volumes may include a sphere or a circle. In various implementations, the method may include determining that the geometric difference causes one or more bounded volumes to be violated. In various implementations, the providing may include providing the output in response to the determining that the geometric difference causes bounded volumes to be violated. In some implementations, the providing may include providing the output in response to a determination that the geometric difference between the actual robot and the geometric model satisfies one or more thresholds.

In some implementations, the image data may be obtained from a two-dimensional camera. In other implementations, the image data may be obtained from a three-dimensional vision sensor such as a stereographic camera. In some implementations, the image data may be obtained at least in part from a camera mounted on the robot.

In some implementations, obtaining the geometric model may include setting the geometric model to conform to the selected pose. In some implementations, the method may further include ceasing operation of the actual robot in response to the output.

Other implementations may include a non-transitory computer readable storage medium storing instructions executable by a processor to perform a method such as one or more of the methods described above. Yet another implementation may include a control system including memory and one or more processors operable to execute instructions, stored in the memory, to implement one or more modules or engines that, alone or collectively, perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
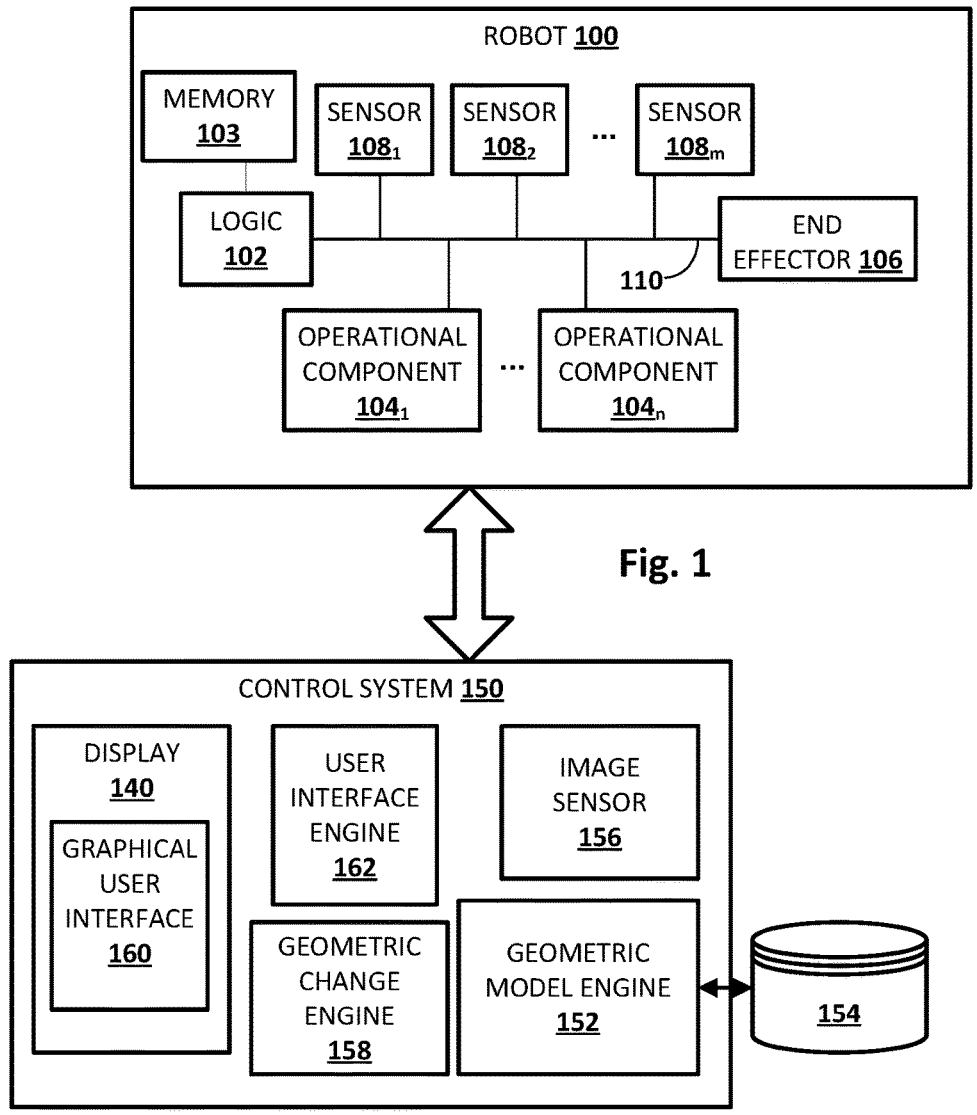
FIG. 1 schematically depicts an example environment in which disclosed techniques may be employed, in accordance with various implementations.

FIG. 1 is a schematic diagram of an example environment in which selected aspects of the present disclosure may be practiced in accordance with various implementations. A robot 100 may be in communication with a control system 150. Robot 100 may take various forms, including but not limited to a telepresence robot (e.g., which may be as simple as a wheeled vehicle equipped with a display and a camera), a robot arm, a humanoid, an animal, an insect, an aquatic creature, a wheeled device, a submersible vehicle, an unmanned aerial vehicle ("UAV"), and so forth. In various implementations, robot 100 may include logic 102. Logic 102 may take various forms, such as a real time controller, one or more processors, one or more field-programmable gate arrays ("FPGA"), one or more application-specific integrated circuits ("ASIC"), and so forth. In some implementations, logic 102 may be operably coupled with memory 103. Memory 103 may take various forms, such as random access memory ("RAM"), dynamic RAM ("DRAM"), read-only memory ("ROM"), Magnetoresistive RAM ("MRAM"), resistive RAM ("RRAM"), NAND flash memory, and so forth.

In some implementations, logic 102 may be operably coupled with one or more operational components $104_{1-n}$, one or more end effectors 106, and/or one or more sensors $108_{1-m}$, e.g., via one or more buses 110. As used herein, an "operational component" 104 of a robot may broadly refer to actuators, motors (e.g., servo motors), joints, shafts, gear trains, pumps (e.g., air or liquid), pistons, drives, or other components that may create and/or undergo propulsion, rotation, and/or motion. Some operational components 104 may be independently controllable, although this is not required. In some instances, the more operational components robot 100 has, the more degrees of freedom of movement it may have.

As used herein, "end effector" 106 may refer to a variety of tools that may be operated by robot 100 in order to accomplish various tasks. For example, some robots may be equipped with an end effector 106 that takes the form of a claw with two opposing "fingers" or "digits." Such as claw is one type of "gripper" known as an "impactive" gripper. Other types of grippers may include but are not limited to "ingressive" (e.g., physically penetrating an object using pins, needles, etc.), "astrictive" (e.g., using suction or vacuum to pick up an object), or "contigutive" (e.g., using surface tension, freezing or adhesive to pick up object). More generally, other types of end effectors may include but are not limited to drills, brushes, force-torque sensors, cutting tools, deburring tools, welding torches, containers, trays, and so forth. In some implementations, end effector 106 may be removable, and various types of modular end effectors may be installed onto robot 100, depending on the circumstances. Some robots, such as some telepresence robots, may not be equipped with end effectors. Instead, some telepresence robots may include displays to render visual representations of the users controlling the telepresence robots, as well as speakers and/or microphones that facilitate the telepresence robot "acting" like the user.

Sensors 108 may take various forms, including but not limited to 3D laser scanners or other 3D vision sensors (e.g., stereographic cameras used to perform stereo visual odometry) configured to provide depth measurements, two-dimensional cameras, light sensors (e.g., passive infrared), force sensors, pressure sensors, pressure wave sensors (e.g., microphones), proximity sensors (also referred to as "distance sensors"), depth sensors, torque sensors, barcode readers, radio frequency identification ("RFID") readers, radars, range finders, accelerometers, gyroscopes, compasses, position coordinate sensors (e.g., global positioning system, or "GPS"), speedometers, edge detectors, and so forth. While sensors $108_{1-m}$ are depicted as being integral with robot 100, this is not meant to be limiting. In some implementations, sensors 108 may be located external to, but may be in direct or indirect communication with, robot 100, e.g., as stand-alone units or as part of control system 150.

Control system 150 may include one or more computing systems connected by one or more networks (not depicted) that control operation of robot 100 to various degrees. An example of such a computing system is depicted schematically in FIG. 5. In some implementations, control system 150 may be operated by a user (not depicted) to exert a relatively high level of control over robot 100, e.g., in real time in response to signals received by a user interface engine 162 and/or one or more readings from one or more sensors 108. In other implementations, control system 150 exerts less direct control over robot 100. For example, control system 150 may provide robot 100 with a high level task such as "go to location, identify person, follow person." Logic 102 on robot 100 may convert such high level tasks into robot action, e.g., by translating one or more high level tasks into a plurality of motion primitives executable by robot 100. In some implementations, control system 150 may include a display 140 (e.g., CRT, LCD, touchscreen, etc.) on which a graphical user interface 160 operable to remotely control robot 100 may be rendered.

Various modules or engines may be implemented as part of control system 150 as software, hardware, or any combination of the two. For example, in FIG. 1, control system 150 includes a geometric model engine 152, a geometric change engine 158, and the aforementioned user interface engine 162. Control system 150 is also depicted with one or more image sensors 156, which may take various forms, such as 3D laser scanners or other 3D vision sensors (e.g., stereographic cameras used to perform stereo visual odometry) configured to provide depth measurements, 2D cameras, and so forth. Geometric model engine 152 may be configured to maintain, e.g., in index 154, one or more 2D or 3D models of robot 100. In some implementations, the models stored in index 154 may be computer-aided design ("CAD") models, although this is not required. In other implementations, the models stored in index may include one or more bounded volumes that contain or encompass various operational components 104 of robot 100, or even the entire configuration space of robot 100.

In various implementations, geometric change engine 158 may be configured to analyze image data captured by image sensor 156 and/or another sensor (e.g., 108) depicting all or part of robot 100 in one or more selected poses. This image data may then be compared to one or more geometric models of robot 100 in the same or similar one or more poses that are provided by geometric model engine 152. For example, a user may operate graphical user interface 160 to command geometric model engine 152 to generate a geometric model 100 of robot 100 in a selected pose. Additionally or alternatively, the user may operate graphical user interface 160 to command robot 100 to adopt the same pose as the geometric model. Either way, based on the comparison, geometric change engine 158 may detect one or more geometric differences between the geometric model of robot 100 and the depiction of robot 100 captured in the image data. These geometric differences may be analyzed to determine, for instance, whether they satisfy various spatial thresholds (e.g., greater than x distance from a surface of robot 100 determined from the geometric model) and/or whether various bounded volumes of the geometric model that represent robot 100 are violated. If geometric change engine 158 determines that the geometric differences satisfy the thresholds and/or violate the bounded volumes, it may provide suitable output, e.g., to a robot operator and/or to one or more robot processes that may, for instance, cease operation of robot 100.

While robot 100 and control system 150 are depicted separately in FIG. 1, this is not meant to be limiting. In various implementations, one or more aspects (e.g., modules, engines, etc.) depicted in FIG. 1 as implemented on one of robot 100 or control system 150 may be implemented on the other, may be distributed across both, and/or may be distributed across one or both in combination with other components not depicted in FIG. 1. In implementations where robot 100 and control system 150 are separate, they may communicate over one or more wired or wireless networks (not depicted) or using other wireless technology, such as radio, Bluetooth, infrared, etc. In other implementations, control system 150 may be implemented entirely or in part using logic 102 of robot 100.

Figure 2A:
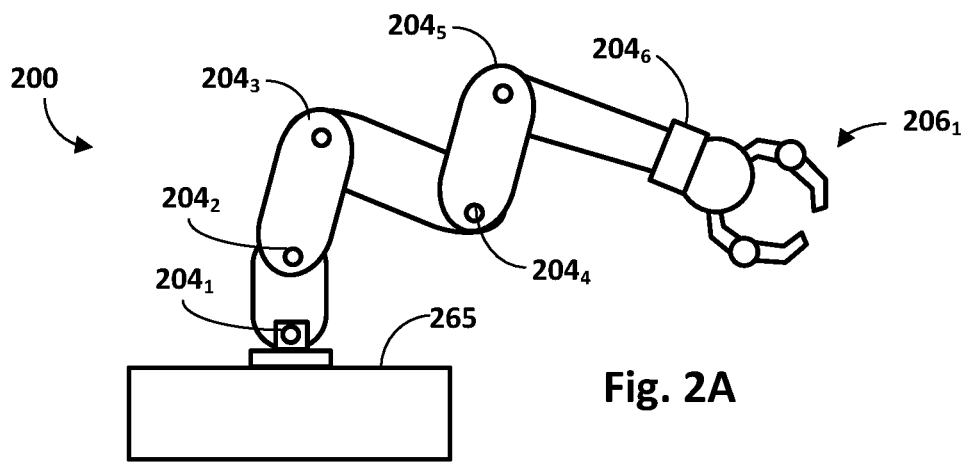
FIGS. 2A, 2B, and 2C depict one example of how disclosed techniques may be practiced, in accordance with various implementations.

FIG. 2A depicts a non-limiting example of a robot 200 in the form of a robot arm. An end effector $206_1$ in the form of a gripper claw is removably attached to a sixth operational component $204_6$ of robot 200. In this example, six operational components $204_{1-6}$ are indicated, mostly in the form of joints. However, this is not meant to be limiting, and robots may have any number of operational components (e.g., joints). Robot 200 also includes a base 265, and is depicted in a particular selected configuration or "pose."

As will be demonstrated below, a configuration or "geometry" of robot 200 may be altered in a manner that affects its operation. For example, end effector $206_1$ may be swapped out for another end effector (e.g., see FIG. 3A). If the replacement end effector has similar dimensions and/or mass as the original end effector $206_1$, then the impact on operation of robot 200 may be limited. However, if the replacement end effector has dimensions and/or mass that is dramatically different than end effector $206_1$, then operation of robot 200 may be impacted more significantly. A robot's geometry can also be changed, for instance, by various robot accessories (e.g., attachments, intermediate components, etc.) being swapped out, added, or removed. Additionally or alternatively, when a robot picks up or releases an object, that may impact the robot's geometry to an extent that affects its performance.

Accordingly, and as was described above, in various implementations, techniques described herein may be used to detect robot configuration changes—particularly changes to a robot's fundamental geometry—that are likely to impact robot operation. In particular, various geometric models of a robot may be compared to image data captured of an actual robot to detect fundamental geometric differences that are likely to impact robot operation. Detected geometric differences may be provided to robot operators as output, and/or the output may trigger various responsive actions. These techniques may give rise to various technical advantages. For example, detecting geometric differences between geometric robot models and image data that captures an actual robot is relatively inexpensive from a standpoint of computing resources (e.g., processors cycles, memory usage, battery power usage), particularly compared to manually updating and/or analyzing a robot's kinematic model after each change. Moreover, techniques described herein may provide a simple way for robot operators to be made aware of robot configuration/geometric changes and their potential impact, so that the operators may take responsive action, such as operating the robot in a manner that compensates for the change, adjusting a kinematic model of the robot to account for the configuration change, and so forth. In some implementations, a robot configuration change detected using techniques described herein may trigger automatic cessation of robot operation.

Figure 2B:
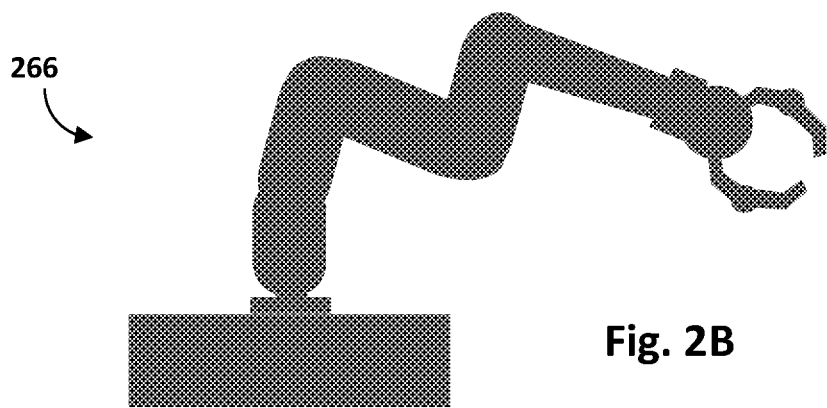

FIG. 2B depicts a simple geometric model 266 of robot 200 in the same pose as was depicted in FIG. 2A. In this example, surface details and other granular details of robot 200 are not visible. Rather, geometric model 266 simply represents a basic 2D or 3D "outline" of robot 200. Geometric model 266 may be obtained from index 154 in various forms. As noted above, in some implementations, geometric model 266 is generated and/or obtained based on a CAD model of robot 200. In other implementations, other types of models may be used in addition to or instead of a CAD model. In some implementations, an outline of geometric model 266 may closely track exterior surfaces and appendages of robot 200. If a configuration/geometry of actual robot 200 changes in the "real world," the resulting geometric difference may be detected when comparing geometric model 266 to image data that captures robot 200 in the same or sufficiently similar pose. In some implementations, if a change in robot configuration causes some portion of robot 200 (whether added or existing prior to the configuration change) to "violate" (e.g., exceed, "puncture") the boundaries of geometric model 266, that violation may be detected in the geometric model/image data comparison, and suitable output may be provided, e.g., to a robot operator and/or to one or more downstream robotic fault processes.

In some implementations, geometric model 266 may be expanded from exterior surfaces and appendages of the actual robot 200 by various degrees, e.g., depending on the sensitivity of the particular robot and/or tasks it performs to geometric change. For example, if robot 200 is intended to be used for relatively delicate tasks (e.g., manipulating small and/or fragile objects), then any change to its geometry, no matter how small, may impact the robot's ability to perform its tasks. In such a scenario, geometric model 266 may closely track actual exterior surfaces and/or appendages of robot 200, so that even a small configuration/geometric change to robot 200 will be detected as a violation of geometric model 266 during the comparison of geometric model 266 to image data captured of robot 200 in the same pose. On the other hand, if robot 200 is only used for less delicate tasks, small changes to the robot's geometry may not be as significant. In such a scenario, geometric model 266 may be expanded outward from actual exterior surfaces and/or appendages of robot 200, so that small geometric changes to robot 200 detected in image data are less likely to violate geometric model 266 and trigger output and/or responsive action.

Figure 2C:
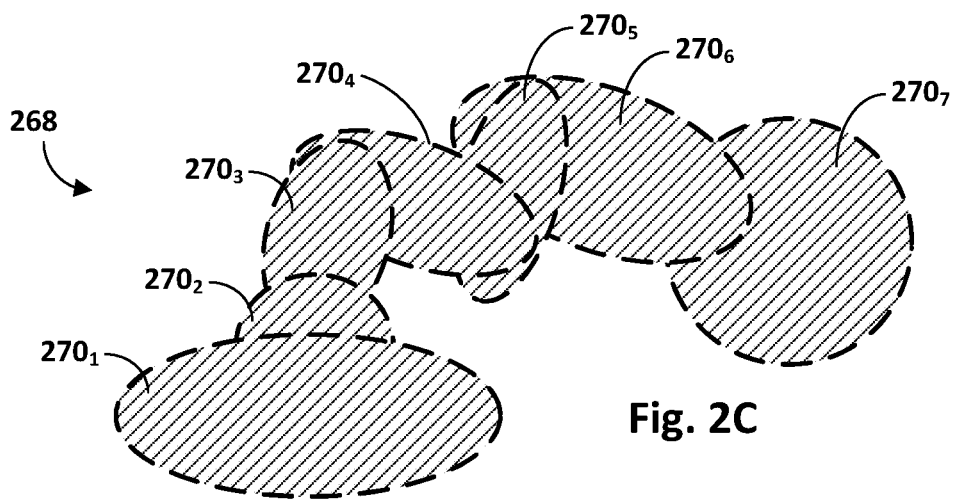

In some implementations, one or more bounded volumes may be estimated and/or generated that contain/encompass one or more operational components 204 of robot 200. For example, FIG. 2C depicts a simplified geometric model 268 that takes the form of a plurality of bounded volumes, 270$_{1-7}$, that each contains at least a portion of an operational component (204 in FIG. 2A) of robot 200. Geometric models 270 that contain or encompass operational components may be generated in various ways. In some implementations, they may be sized and/or shaped to encompass one or more operational components. In some implementations, they may be sized and/or shaped to encompass multiple possible configurations of one or more operational components, such as the entire configuration space of one or more operational components, or even the entire configuration space of the robot itself. Additionally or alternatively, bounded volumes may have various 2D and/or 3D shapes (e.g., depending on whether the image sensor that captures an image of robot 200 is a 2D or 3D image sensor), such as the spheres and/or ellipsoids that form bounded volumes 270$_{1-7}$ in FIG. 2C, as well as other 2D and/or 3D shapes such as squares, rectangles, triangles, diamonds, cubes, cones, pyramids, various polygons, and so forth.

Figure 3A:
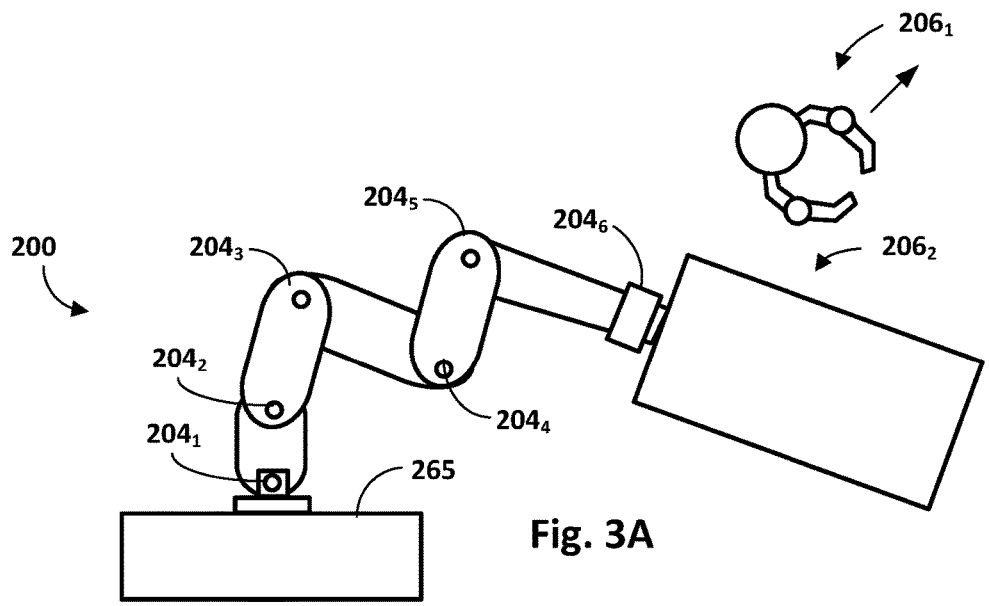
FIGS. 3A and 3B depict more examples of how disclosed techniques may be practiced, in accordance with various implementations.
Figure 3B:
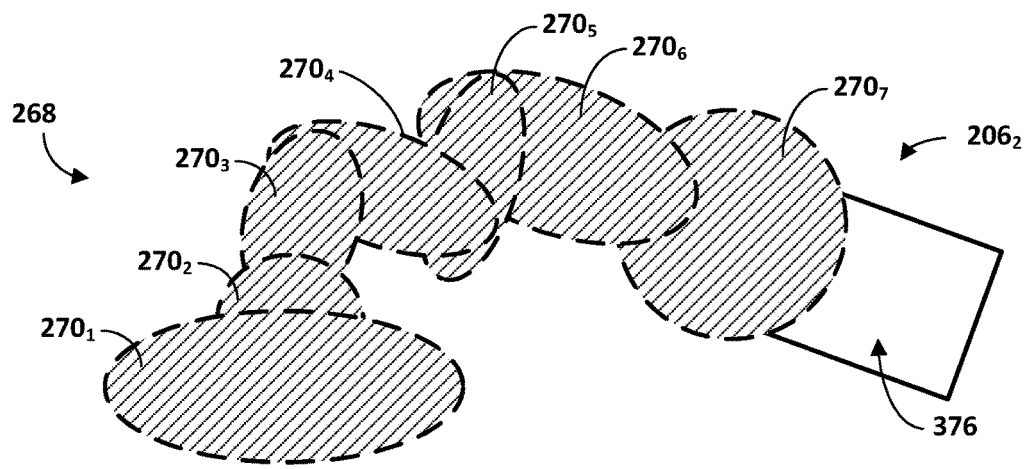

FIGS. 3A and 3B depict an example of how a geometric change to a robot may be detected and trigger output/responsive action, in accordance with various implementations. In FIG. 3A, the same robot 200 that was depicted in FIG. 2A is shown with first end effector 206$_1$ having been replaced with a second end effector 206$_2$ that is much larger (the function of second end effector 206$_2$ is not important for purposes of the present disclosure, and therefore it is simply depicted as a rectangle). Second end effector 206$_2$ is much larger than first end effector 206$_1$. Consequently, attaching second end effector 206$_2$ may impact operation of robot 200. For example, the likely increased mass of second end effector 206$_2$ may alter a center of gravity of robot 200. If base 265 is not secured to a surface, the change in center of mass may cause robot 200 to tip over if second end effector 206$_2$ is extended too far away from base 265.

In some circumstances, second end effector 206$_2$ may be a modular component that, when affixed to robot 200, automatically transmits its dimensions to robot 200 and/or to a remote robot control system (e.g., 150 in FIG. 1). In such a circumstance, robot 200 and/or the remote control system may be able to compensate automatically and/or otherwise take responsive action. However, if second end effector 206$_2$ does not make such a transmission, does not include its dimensional data, or transmits its dimension data in an incompatible format, then robot 200 may not be able to compensate, and a robot operator may not even be aware that robot 200 might behave erratically.

Accordingly, using techniques described herein, this change in geometry depicted in FIG. 2A may be detected automatically, and responsive action may be taken. For example, FIG. 3B depicts the same geometric model 268 of FIG. 2C. As indicated at 376, the end of second end effector 206$_2$ violates seventh bounded volume 270$_7$, e.g., by "puncturing" it. This violation may be detected, e.g., by geometric change engine 158, and analyzed. In some implementations, the violation may automatically trigger responsive action. In other embodiments, the violation may be quantified and/or compared to one or more thresholds to determine, for instance, whether the added robotic geometry (e.g., 376) that lies outside of the bounded volume will likely impact robot operation. If the one or more thresholds are satisfied, responsive action may be triggered, e.g., by geometric change engine 158.

The example geometric violation depicted in FIG. 3B is not intended to be limiting. In addition to or instead of a violation occurring when an operational component extends beyond a bounded volume, in some implementations, a violation may occur where a distance between an operational component and its corresponding bounded volume is too great (i.e., the operational component has become much smaller than its bounded volume). For example, if an operational component and/or an end effector is replaced with a much smaller operational component and/or end effector, or is removed altogether, that may impact robot operation. For example, it might change the robot's center of gravity. Additionally or alternatively, removal of an end effector may effectively remove the robot's ability to perform the function enabled by the removed end effector. For example, an operator should be notified when, for instance, a gripper end effector has been removed (or been damaged or knocked off), so that the operator knows they can no longer operate the robot to perform the function enabled by the end effector.

While end effectors have been described in examples herein as components that have their geometry changed in a manner that might impact robot performance, this is not meant to be limiting. Geometric change to any operational component of a robot (even intermediate components of kinematic chains) may impact robot performance, and therefore may be detected using techniques described herein. For example, a protective covering may be placed on one or more portions of a robot, e.g., when the robot is operated in an area such as a disaster zone or robot competition in which it might be damaged. Depending on how big such protective coverings are, they may change the robot's geometry sufficiently to impact robot performance, and therefore may be detected using disclosed techniques. Additionally or alternatively, when a robot picks up or drops an object, that may impact robot operation, depending on the size of the object. Accordingly, in some implementations, such geometric changes may be detected. In some cases, the robot's geometry and/or kinematic model may be updated each time it picks up or drops an object, assuming the object caused a geometric change sufficient to be detected using disclosed techniques.

Figure 4:
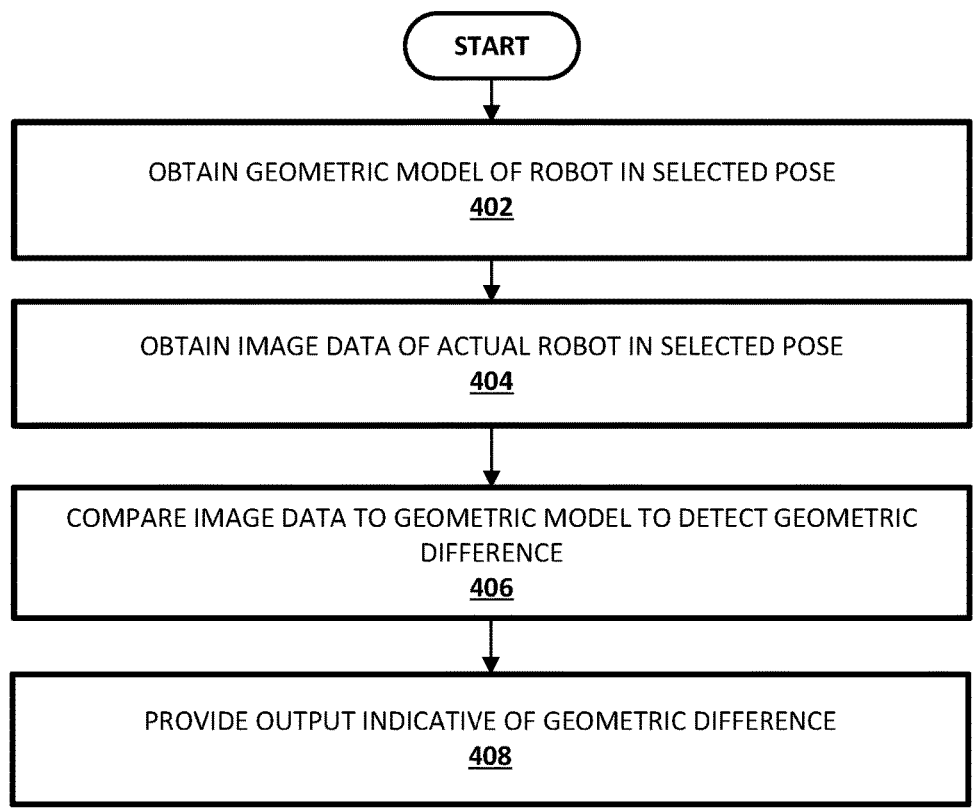
FIG. 4 depicts an example method in accordance with various implementations.

Referring now to FIG. 4, an example method 400 of detecting a geometric change in a robot's configuration and taking responsive action in instances where the geometric change is likely to impact operation of the robot is described. For convenience, the operations of the flowchart are described with reference to a system that performs the operations. This system may include various components of various computer systems. For instance, some operations may be performed at robot 100, while other operations may be performed by one or more components of control system 150. Moreover, while operations of method 400 are shown in a particular order, this is not meant to be limiting. One or more operations may be reordered, omitted or added.

At block 402, the system may obtain a geometric model of a robot in a selected pose. For example, if an actual robot is manipulated to a particular pose, data indicative of that pose may be provided to geometric model engine 152, which may use data from index 154 to return a geometric model in the same or similar pose. In some implementations, geometric model engine 154 may take into account a viewing angle of image sensor 156 when generating the geometric model, e.g., so that the geometric model it provides will appear similar to the robot as viewed by image sensor. For example, geometric model engine 154 may generate a rendition of the geometric model of the robot from the same perspective as image sensor 156 has relative to the actual robot. While examples herein describe image data being acquired from image sensor 156 that is external to robot 100, this is not meant to be limiting. In various implementations, one or more image sensors (108) on robot 100 itself may capture the image data. In such cases, geometric model engine 154 may employ the perspective of the particular robot image sensor 108 being used to obtain image data when rendering the geometric model. At block 404, the system may obtain image data of the actual robot in the selected pose. In various implementations, the operations of blocks 402 and 404 may be performed in reverse and/or in parallel.

At block 406, the system may compare the image data obtained at block 404 to the geometric model obtained at block 402 to detect a geometric difference between the geometric model and the actual robot. At block 408, the system may provide output indicative of the detected geometric difference, e.g., to a robot operator and/or to one or more downstream robot processes that are configured to take responsive action such as updating the robot's kinematic model and/or stopping the robot to avoid damage/injury. For example, in some implementations, a visual rendition of the geometric model may be displayed, e.g., on display 140. One or more operational components that are found to have been geometrically changed may be visually highlighted, e.g., with textual annotation, different colors, animation (e.g., blinking), and so forth, to notify the robot operator of the change. In response, the robot operator may take various responsive actions, such as operating the robot in a manner that compensates for the change in geometry, or by manually updating the robot's kinematic and/or geometric model.

In some implementations, the robot's geometric model may be updated in response to a detected geometric change, e.g., by geometric model engine 152, so that the geometric change persists over time for future comparisons. For example, suppose a robot operator is notified of a geometric change, but the operator approves of the change, e.g., by ignoring, dismissing, or cancelling some alarm. When a geometric change is "approved" in this manner, that change may be added to the robot's geometric model (or multiple models as the case may be) so that in future comparisons, the geometric change will not continue to trigger responsive action.

Figure 5:
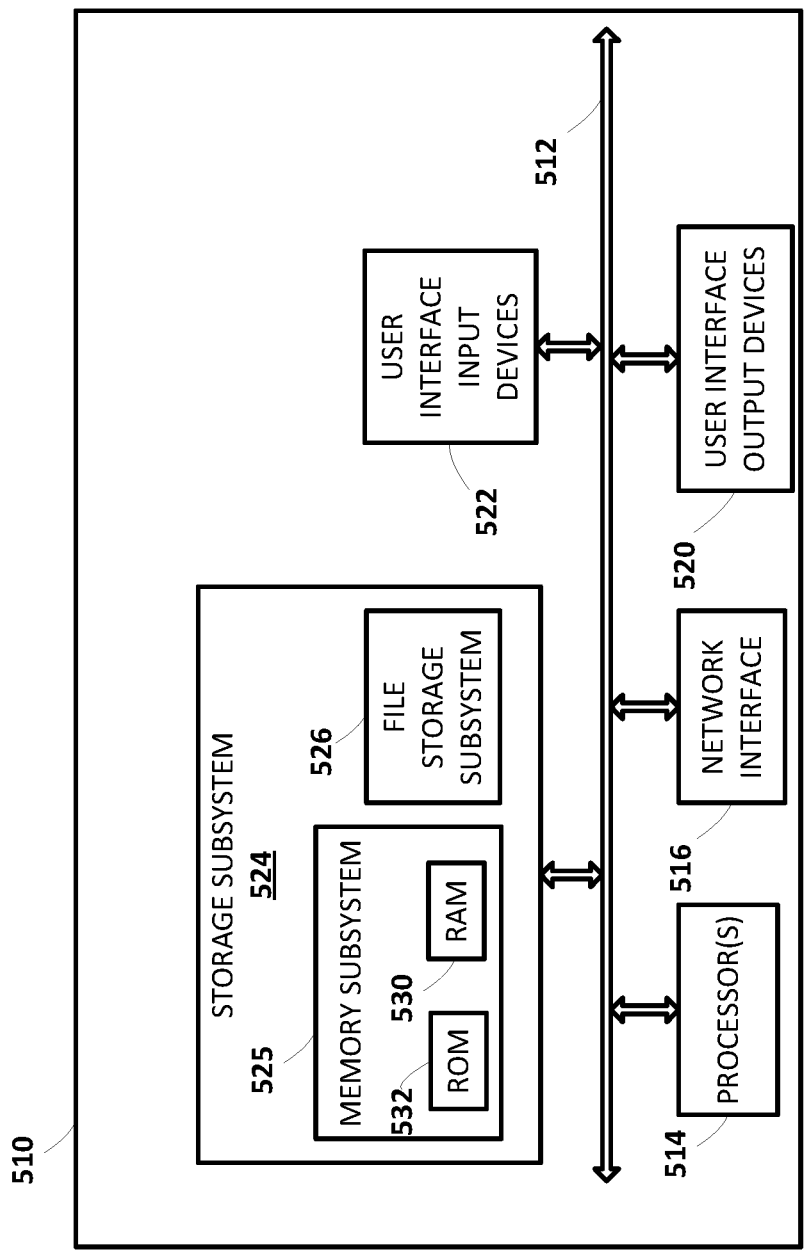
FIG. 5 schematically depicts an example architecture of a computer system.

FIG. 5 is a block diagram of an example computer system 510. Computer system 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 may include the logic to perform selected aspects of method 400, and/or to implement one or more aspects of robot 100 or control system 150. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a CD-ROM drive, an optical drive, or removable media cartridges. Modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, smart phone, smart watch, smart glasses, set top box, tablet computer, laptop, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A computer-implemented method, comprising:
obtaining, by one or more processors, a geometric model of an actual robot in a selected pose, wherein obtaining the geometric model comprises determining one or more bounded volumes containing one or more operational components of the robot, wherein each of the one or more bounded volumes encompasses multiple possible configurations of a given operational component of the one or more operational components;
obtaining, by one or more of the processors from an image sensor, image data of the actual robot in the selected pose;
comparing, by one or more of the processors, the image data to the geometric model to detect a geometric difference between the geometric model and the actual robot;
determining, by one or more of the processors, that the geometric difference causes one or more of the bounded volumes to be violated;
providing, by one or more of the processors, output indicative of the violation; and
based on the output:
altering a kinematic model of the actual robot and operating the actual robot based on the altered kinematic model; or
ceasing operation of the actual robot.

2. The computer-implemented method of claim 1, further comprising updating, by the one or more processors, the geometric model in response to the detected geometric difference.

3. The computer-implemented method of claim 1, wherein the output comprises a warning that the robot will potentially behave unpredictably due to the geometric difference.

4. The computer-implemented method of claim 1, wherein the geometric model of the robot is based on a computer-aided design of the actual robot.

5. The computer-implemented method of claim 1, wherein at least one of the one or more bounded volumes comprises a sphere.

6. The computer-implemented method of claim 1, wherein at least one of the one or more bounded volumes comprises a circle.

7. The computer-implemented method of claim 1, wherein the providing comprises providing the output in response to a determination, by one or more of the processors, that the geometric difference between the actual robot and the geometric model satisfies one or more thresholds.

8. The computer-implemented method of claim 1, wherein the image data is obtained from a two-dimensional camera.

9. The computer-implemented method of claim 1, wherein the image data is obtained from a three-dimensional vision sensor.

10. The computer-implemented method of claim 1, wherein the image data is obtained from a stereographic camera.

11. The computer-implemented method of claim 1, wherein the image data is obtained at least in part from a camera mounted on the robot.

12. The computer-implemented method of claim 1, wherein obtaining the geometric model comprises setting the geometric model to conform to the selected pose.

13. A system comprising one or more processors, an image sensor, and memory, wherein the memory stores instructions that, in response to execution of the instructions by the one or more processors, cause the one or more processors to:
obtain a geometric model of a robot in a selected pose, wherein the geometric model includes one or more bounded volumes containing one or more operational components of the robot, wherein each of the one or more bounded volumes encompasses multiple possible configurations of a given operational component of the one or more operational components;
obtain, from the image sensor, image data of the actual robot in the selected pose;
compare the image data to the geometric model to detect a geometric difference between the geometric model and the actual robot;
determine that the geometric difference causes one or more of the bounded volumes to be violated;
provide output indicative of the violation; and
based on the output:
alter a kinematic model of the actual robot and operating the actual robot based on the altered kinematic model; or
cease operation of the actual robot.

14. The system of claim 13, further comprising instructions to update the geometric model in response to the detected geometric difference.

15. At least one non-transitory computer-readable medium comprising instructions that, in response to execution of the instructions by one or more processors, cause the one or more processors to perform the following operations:
obtaining a geometric model of a robot in a selected pose, wherein obtaining the geometric model comprises determining one or more bounded volumes containing one or more operational components of the robot, wherein each of the one or more bounded volumes encompasses multiple possible configurations of a given operational component of the one or more operational components;
obtaining, from an image sensor, image data of the actual robot in the selected pose;
comparing the image data to the geometric model to detect a geometric difference between the geometric model and the actual robot;
determining, by one or more of the processors, that the geometric difference causes one or more of the bounded volumes to be violated;
providing output indicative of the geometric difference between the geometric model and the actual robot; and
based on the output:
altering a kinematic model of the actual robot and operating the actual robot based on the altered kinematic model; or
ceasing operation of the actual robot.

16. The at least one non-transitory computer-readable medium of claim 15, wherein the geometric model of the robot is based on a computer-aided design of the actual robot.

* * * * *